Feb. 2, 1960
G. E. McGUIRE ET AL
2,923,418
HYDRAULICALLY ACTUATED DERRICK ATTACHMENT FOR VEHICLES
Filed Aug. 3, 1955
3 Sheets-Sheet 1
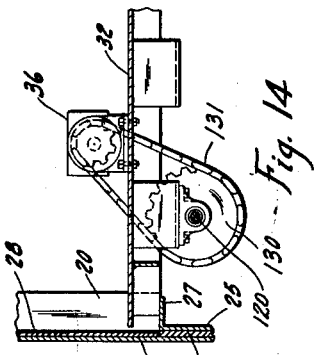
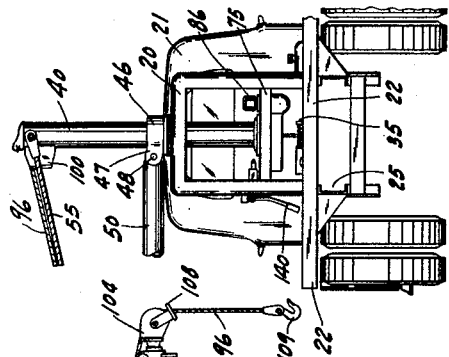
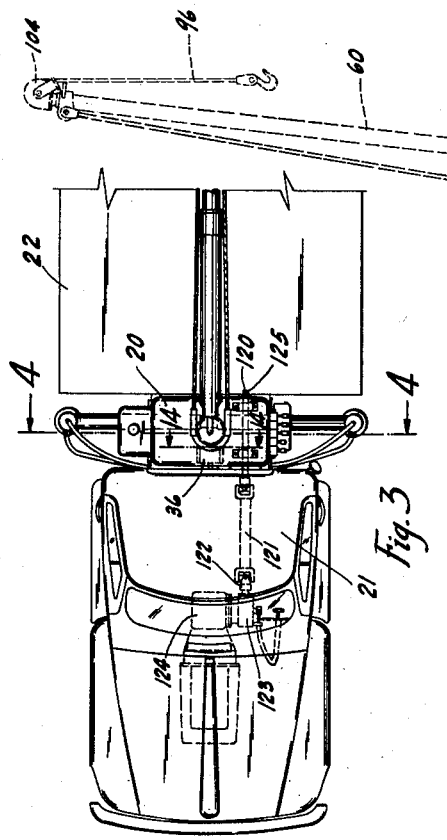
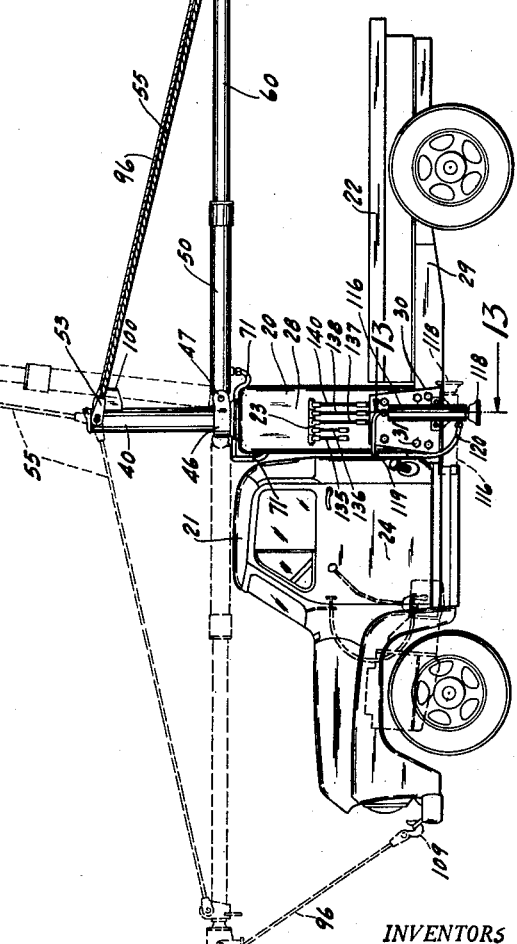
INVENTORS
GEORGE E. McGUIRE
RICHARD F. UREN
BY FRANK G. WOODSIDE
Wheeler, Wheeler Wheeler
ATTORNEYS

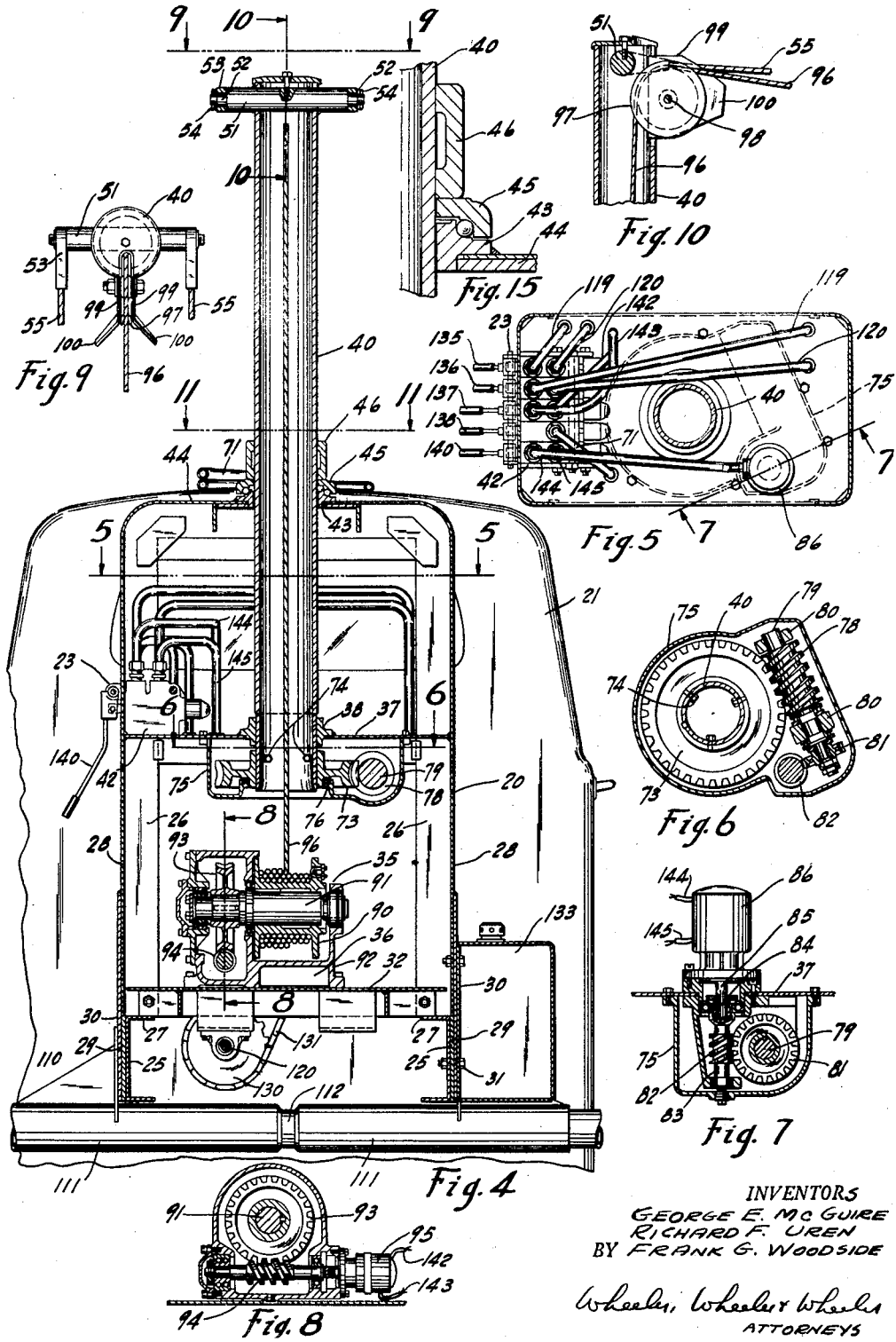

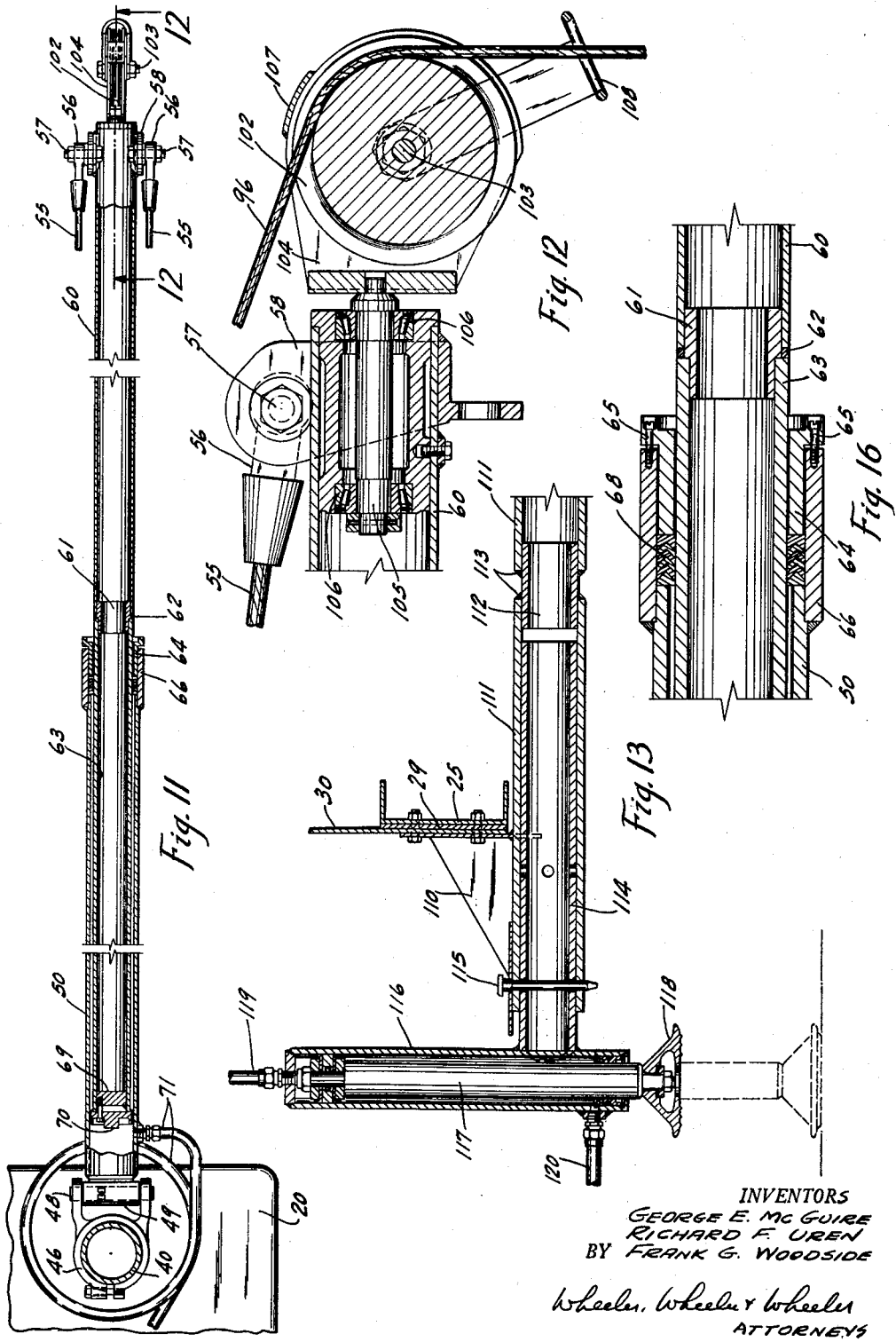

United States Patent Office 2,923,418
Patented Feb. 2, 1960

2,923,418

HYDRAULICALLY ACTUATED DERRICK ATTACHMENT FOR VEHICLES

George E. McGuire, Richard F. Uren, and Frank G. Woodside, Milwaukee, Wis., assignors, by mesne assignments, to L. A. Young Spring & Wire Corporation, Detroit, Mich., a corporation of Michigan Application August 3, 1955, Serial No. 526,125

7 Claims. (Cl. 212—59)

This invention relates to a hydraulically actuated derrick attachment for vehicles.

A major feature of the device is concerned with its unitary organization. The entire structure is mounted upon and within a frame having the form of an inverted U, the legs of which are designed to rest at the end directly upon the vehicle frame and have extensions straddling the vehicle frame and connected therewith for rigid support. The attachment frame has the form of a broad channel in all cross sections not only for strength, but for weight distribution and stability of mounting on the frame of a truck or trailer to which it is applied. The organization is such that power can be derived from any appropriate power take-off and applied to a pump mounted on the attachment frame.

The entire organization is carried by the attachment frame including a mast and boom; the aforesaid pump and its driving connections and the oil tank from which the pump derives hydraulic fluid; a hydraulic motor which rotates the mast and the motion transmitting connections from the motor to the mast; a winch and the hydraulic motor connections for its operation; an extensible section of the boom and the hydraulic connections for its actuation; hydraulic steadying jacks for ground engagement at opposite sides of the vehicle and the supports upon which the jacks are pivotal between retracted and operative positions and the connections for operating and retracting the jack rams; and the controls whereby the operation of all of the operating parts is subject to direct and convenient control by the operator. Application of the box frame of the attachment to the frame of the vehicle serves, in a single operation, to make all of the parts instantly available for use, subject only to the connection to the vehicle power take-off.

Another feature of the invention consists in the mast mounting, which comprises a combination radial and thrust bearing on the top of the U-shaped attachment frame, with a radial bearing at a lower level on a cross member of the sub-frame, with driving connections disposed in an oil pan at the free end of the mast below such level. The boom is connected to the mast above the box frame, the boom being pivoted to a collar mounted on the mast directly above the thrust bearing and having a connection of fixed length between the end of its extension and the top of the mast so that the projection of the extension will automatically effect the raising of the free end thereof about the pivotal connection between the boom and the mast.

The boom extension is guided in part in a machined bearing in the outer end of the boom, the rest of the interior of the boom being unmachined and the inner end of the extension having guide means within the boom, which requires no machined bearing. There is a journaled shank at the outer end of the boom extension which carries a head in which a sheave is mounted, the cable from the sheave extending to the top of the boom parallel to the fixed-length cables above referred to and there being led over a sheave mounted in a bracket which has divergent arms upon which the boom seats in its elevated position. From the sheave, the hoisting cable extends downwardly through the interior of the hollow mast to the winch mounted near the bottom of the attachment frame.

The steadying jacks are mounted on the outsides of the legs of the inverted U-shaped attachment frame or horizontal and laterally projecting studs which permit the jacks to be rotated bodily between horizontal positions for transportation and vertical positions for use. Each jacks includes an extensible ram permanently connected with the hydraulic system of the attachment to be extended and retracted as desired by the operator. With the rams extended, support is provided for the entire vehicle directly beneath the attachment frame and mast, and the mast and boom are steadied against tilting as the boom swings laterally during operation.

Further particulars of the structure broadly outlined will be found in the accompanying drawings in which:

Fig. 1 is a view in side elevation of the attachment of the present invention as it appears mounted on the frame of a truck.

Fig. 2 is a view fragmentarily illustrating the device of Fig. 1 in rear elevation.

Fig. 3 is a view fragmentarily illustrating the device of Fig. 1 as it appears in plan.

Fig. 4 is a view on an enlarged scale taken in section on the line 4—4 of the Fig. 3.

Fig. 5 is a view taken in section on the line 5—5 of Fig. 4.

Fig. 6 is a view taken in section on the line 6—6 of Fig. 4.

Fig. 7 is a view taken in section on the line 7—7 of Fig. 5.

Fig. 8 is a view taken in section on the line 8—8 of Fig. 4.

Fig. 9 is a view taken in section on the line 9—9 of Fig. 4.

Fig. 10 is a view taken in section on the line 10—10 of Fig. 4.

Fig. 11 is a view of the boom partially in plan and partially in axial section on an enlarged scale as compared with Fig. 1.

Fig. 12 is a further enlarged detail view taken in section on the line 12—12 of Fig. 11.

Fig. 13 is an enlarged view taken in section on the line 13—13 of Fig. 1.

Fig. 14 is a view taken in section on an enlarged scale on the line 14—14 of Fig. 3.

Fig. 15 is a view fragmentarily illustrating the radial and thrust bearing for the mast in the plane of Fig. 4 but on a further enlarged scale.

Fig. 16 is an enlarged scale detail view in section through the bearing between the boom and boom extension in the plane of Fig. 11.

Since the unitary attachment of the present invention can be mounted in any desired position on a truck or trailer frame, the mounting shown in Figs. 1 to 4 is to be regarded as generically representative. It does, however, have definite advantages in the particular installation shown, since the attachment frame 20 is located between the truck cab 21 and bed 22 where the control set generically designated by reference character 23, are conveniently adjacent to the cab door 24.

The vehicle frame conventionally comprises a pair of laterally spaced channels 25 as shown in Fig. 4. The attachment frame is of U-shaped form in front and rear elevation and is channeled in cross section, having flanges 26 which are at least as deep as the flanges 27 of the vehicle frame channels 25, so that the ends of the legs of the inverted U-shaped attachment frame rest directly upon, and are supported directly from, the frame channels 25.

The web portions 28 of the channels comprising the attachment frame 20 are very broad, as clearly appears in Fig. 1, therewith contributing to the stability of the mounting. Plates 29 may be attached to the splicing extensions 30 which extend downwardly outside of the vehicle frame and are connected thereto in any desired manner as by bolts 31. (Fig. 4.) The plates 29, through which the attaching bolts 31 extend, reinforce the vehicle frame as well as serving as shims between the splicing plates 30 of the vehicle frame to assure a rigid connection.

The attachment frame is provided with lateral shelves or supports at two levels. There is a heavy bed shelf at 32 near the bottom of the attachment frame which is bolted to the lower ends of the legs 26 of the attachment frame and may rest directly on the flanges 27 of the vehicle frame. Upon the bed shelf 32 are mounted the winch 35 and the hydraulic pump 36 and the actuating connections therefor as hereinafter described. Upon the intermediate shelf or platform 37 are mounted the lower bearing 38 for the mast 40 and the motor and driving connections for rotating the mast as hereinafter described. Also mounted on shelf 37, and the outside of one of the legs 26 of the attachment frame, is the valve casing 42 from which the supply and the various control connections lead to the controlled parts.

The principal support for mast 40 is provided by a combined thrust and radial anti-friction bearing which has a lower race 43 mounted on the top member 44 of the inverted U-shaped attachment frame 20. The upper race 45 is mounted intermediate the upper and lower ends of the mast 40. A collar at 46 surrounds the mast and rests on the race 45 and has projecting laterally spaced ears 47 cross connected by a pintle 48 upon which is pivoted the bearing sleeve 49 at the inner end of the boom cylinder 50. See Figs. 1, 4, 11 and 15.

The mast extends upwardly for a substantial distance above the collar 46 to which the boom is pivoted. Near the top of the mast is a transverse bar 51 welded diametrically of the mast and having its projecting ends provided with bearings 52 of reduced diameter. Upon these are pivotally anchored the ties 53 secured in place by nuts 54 and from which the tension cables 55 extend at opposite sides of the boom to the connectors 56, which are similarly pivoted on bolts 57 that project laterally from a yoke 58 encircling the boom extension 60 near its outer end, as best shown in Figs. 11 and 12.

The boom extension 60 is mounted by means of an interior splicing sleeve 61 and weld 62 at the end of a tubular plunger 63 as best shown in Fig. 16. This plunger telescopes through a bushing 64 anchored by cap screw 65 into the end of a sleeve 66 welded at the end of boom cylinder 50. The arrangement is such that only the sleeve 64 requires machining for the guidance of the piston portion 63 of the boom extension, the said piston portion 63 being the only part of the boom extension which is machined. Confined between the bushing 64 and the boom cylinder 50 is packing 68 which is compressed by tightening the cap screws 65.

Welded within the inner end of the piston 63 is a closure 69 as shown in Fig. 11. A guide cap 70 is screwed to the closure and is loosely fitted within the unmachined inner surface of the cylinder 50. A hydraulic pressure line 71 extends to the inner end of cylinder 50 adjacent the pivotal connection of the latter to the mast. Hydraulic liquid pumped under pressure into the boom cylinder 50 will cause the piston portion 63 of the boom extension to be expelled from the cylinder, thereby increasing the overall length of the boom. Inasmuch as the cables 55 are of fixed length, the increase in overall length of the boom can be accommodated only by the upward pivotal movement of the boom about its connection with the mast toward the upright position indicated at dotted lines in Fig. 1. In order that the boom may be rotated about the vertical axis of the mast by the bodily rotation of the mast and the collar 46, the pressure line 71, leading to the boom cylinder 50, is desirably coiled about the mast and rests on the broad upper surface of the attachment frame 20.

The bearing 38 for the lower end of the mast is welded to the shelf plate 37 which spans the attachment frame 20 at an intermediate level as above described. An oversize hole for bearing 38 is provided in the shelf plate 37, and the bearing 38 is welded to the plate after it has determined its own position in the oversize hole, thereby assuring accurate alignment of the bearings. The reduced lower terminal portion of the mast extends through the shelf plate beyond bearing 38 and carries a worm gear 73 whereby the mast may be rotated about its vertical axis in the manner shortly to be described. Since the lower end of the mast is open, the anchorage of the gear to the mast may conveniently be made by bolts 74 which extend outwardly through the tubular mast into the hub of gear 73. A pan 75 retains oil within which the gear operates. The pan has an annular sealing ring 76 bearing against a portion of the gear hub, as best shown in Fig. 4.

Meshing with the worm gear 73 is a worm 78 mounted on shaft 79 which operates in bearing 80 as best shown in Fig. 6 and carries a worm gear 81 driven by worm 82 on shaft 83, the latter being socketed to receive the splined end 84 of a shaft 85 driven by hydraulic motor 86 as best shown in Fig. 7. The arrangement is such that both worm gears and worms, in driving train between motor 86 and the rotatably mounted tubular mast 40, are lubricated by lubricant contained in the enclosing pan 75.

The hoist mechanism shown at 35 and above referred to, includes a drum 90 mounted on drum shaft 91, which is carried by bearings in a sub-frame 92 resting on the bottom on base 32 of the attachment frame. Also carried by the shaft 91 is a worm gear 93 driven by a worm 94 in direct drive connection with the shaft of motor 95. The motor 95 may be operated in either direction to wind or unwind upon drum 90 the cable 96 which leads upwardly through mast 40 to the sheave 97 which is mounted in a slot near the top of the mast, being supported on a shaft 98 carried between arms 99, which are welded to the mast at opposite sides of the slot and flare, as indicated at 100 in Fig. 9, to provide a seat into which the boom is received in the upright position indicated by dotted lines in Fig. 1.

From the sheave 97 at the top of the mast, the hoist cable 96 extends outwardly between the fixed length tension cables 55 to another sheave 102, which is mounted to rotate on shaft 103 in a head 104 swiveled by means of shaft 105 and bearings 106 in the outer end of the boom extension as best shown in Fig. 12. Guides 107 and 108 confine the cable 96 to maintain it in the channel of pulley 102. A hook 109 or any other type of work-supporting device can be attached at the free end of cable 96, so that the winding or unwinding of cable 96 with respect to the drum 90 of winch 35, will raise or lower the load.

Each of the splicing plates 30 is provided, as best shown in Fig. 13, with a bracket 110 which supports a sleeve 111 disposed transversely of the vehicle frame. The sleeves 111, extending from opposite sides of the frame, are desirably cut to be spaced somewhat from each other, as best shown in Fig. 13, and are connected by a tubular dowel 112 to which they are welded at 113. This part of the installation is the only one requiring any welding for the mounting of the attachment to the truck.

Telescopically adjustable in the respective sleeves 111 are extension sleeves 114, which may be projected laterally to any desired extent from the truck frame and may be anchored in desired positions of extension and rotative adjustment by means of rotatable pins 115, also shown in Fig. 13. At their ends, the telescopically extensible and rotatable sleeves 114 carry the jack cylinders 116, within which the rams 117 are hydraulically extensible to engage the feet 118 with the surface of the earth beside the truck, to contribute to the support and the bracing of the truck frame during the use of the hoist. The rams are double acting within their respective cylinders 116, having extension pressure pipe connection at 119 and retraction pipe connection at 120. The rams are normally carried in the horizontal position shown in dotted lines in Fig. 1 during movement of the truck on the highway, but they are rotated to upright positions shown in full lines in Fig. 1 prior to use of the equipment.

Also mounted on the bed plate 32 of the attachment frame 20 are pillow blocks for a drive shaft 120. (See Figs. 3 and 4.) This shaft is connected in any appropriate manner, as by the universally jointed driving shaft 121, with the shaft 122 of the power take-off 123 of the truck transmission 124. It will be observed that the remote end of shaft 120 is exposed at 125 (Fig. 3), so that any other device requiring power for its operation may be driven through the same power take-off. This may include another hoist of construction identical to that already described and mounted either on the same vehicle or on a trailer.

The sprocket 130 mounted on shaft 120 is connected by chain 131 with the pump 36 to supply the hydraulic power for the operation of the various devices disclosed. The pump 36 pumps hydraulic liquid from a supply reservoir 133, mounted on one of the splicing plates 30, desirably at the side of the vehicle opposite that on which the control set 23 is mounted to the attachment frame 20. The valve levers arranged to control the valves (not shown) in the control housing 42, include a lever 135, for the left stabilizing jack 116, 117; a lever 136 for the right stabilizing jack; a lever 137 for the winch; a lever 138 for extending and retracting the boom; and a lever 140 for rotating the mast. In general, the arrangement is correlated with those parts which are raised or lowered hydraulically so that the raising of the lever will raise the controlled part and the lowering of the lever beyond its neutral or intermediate position will lower the controlled part. Thus, levers 135 and 136 are raised to retract the rams 117 of their respective jacks and lowered to lower such rams. The lever 137 is raised to operate the winch in a hoisting direction and lowered to operate the winch in a lowering direction. The lever 138 is raised to advance the boom extension, thereby raising the boom, and is lowered beyond its neutral position to retract the boom extension and thereby lower the boom. The lever 140 may rotate the mast and boom counterclockwise when raised and clockwise when lowered beyond its neutral position.

In the neutral position of the several levers, all valves are closed, whereby the parts are held fixed in the positions to which they have been moved. It will be observed in Fig. 5 that two pressure and relief connections 119 and 120 are supplied to the respective stabilizing jacks, two connections 142 and 143 are supplied to the winch motor 95, and connections 144 and 145 are supplied to the mast rotating motor 86. However, there is but a single connection at 71 to the boom cylinder 50, since the boom is collapsed and lowered under its own weight when the valve 138 is connected to discharge and requires no positive pressure connection for lowering.

It is important to the safe operation of the device that the hydraulic pressure line 71 opens into the cylinder 50 at the side of the cylinder and at a point spaced from the end thereof, whereby the loosely fitted guide cap 70 covers the port 71 and materially restricts flow thereto before the loosely fitted cap 70 reaches the rear end of the cylinder. Accordingly, even if the supply line 71 were to spring a leak, the boom would be materially checked in its lowering operation before reaching its lowermost position.

For transportation purposes, the mast and boom are rotated to the forward dotted line position of Fig. 1, where the hook 109 may be connected with the front bumper of the vehicle as shown. In the rearward position of the boom shown in full lines, or any intermediate lateral position at either side of the truck bed, a load may be picked up. By raising the boom, as by projecting hydraulically its extension 60 from cylinder 50, the sheave head 104 may be centered over any part of the truck bed so that the unwinding of the line 96 from the winch will deposit the load on the desired part of the truck bed. Unloading is done by a converse operation, the load being picked up from the truck bed and deposited under full hydraulic control at any desired point rearwardly or forwardly or laterally of the vehicle.

With the exception of the stabilizing jacks, use of which may be optional in many cases, no mounting work is required other than the positioning of the attachment frame 20 on the vehicle frame with the splicing extensions of its legs straddling the frame and connected therewith. However, the connection of the jack bearing sleeves to each other beneath the frame provides an extremely strong rigidifying support for the frame as well as for the attachment. It may be noted that when the jacks are in use, each may be extended to any desired degree of projection, independently of the other, so that the vehicle and attachment will be stabilized regardless of ground surface levels.

The unitary mounting of the apparatus upon and within the attachment frame not only greatly expedites the mounting and dismounting with respect to a vehicle frame, but it is noteworthy that the attachment frame as shown is actually outside of, and in weather protective relation to, much of the mechanism so that, quite apart from any other housing element, it acts as a partial housing for the hydraulic motors and driving connections.

The particular mounting of the mast in and upon the attachment frame through the particular type of bearings herein provided has proved to be very serviceable, enabling the driving connections to be adequately lubricated and enabling the hoist line 96 to pass freely through the completely unobstructed end and interior of the mast.

We claim:

1. A hoist for unitary mounting on a vehicle frame and comprising a hoist frame, a mast rotatably mounted on the hoist frame, a boom pivotally mounted on the mast, a winch mounted on the hoist frame comprising a drum having a line trained over the top of the mast and the end of the boom, hydraulic motors mounted on the hoist frame and respectively connected with the mast and the winch, a hydraulic system mounted on the hoist frame and comprising a reservoir and a pump having valve controlled connections to said motors, and means mounted on the hoist frame and connected with the pump for the hydraulic elevation of the boom, said hoist frame comprising an inverted U-shaped channel having broad upright legs with inwardly directed lateral flanges and a broad top with inwardly directed lateral flanges, the intersection of said flanges being connected in bracing relation, the said legs being connected by transverse shelf members near their bottom ends and at a level intermediate their height, the mast having bearings upon the top of the hoist frame and on the intermediate shelf, and its motor and rotating connections being supported from the intermediate shelf, the winch being located on the shelf at the bottom of said legs and having its motor and driving connection supported from the last mentioned shelf.

2. In a hoist, the combination with a frame having housing elements including side channels, top, bottom, and intermediate channels, said channels having complementary flanges which are interconnected in bracing relation at the intersection of the top, bottom and intermediate channels with the side channels to form a rigid frame substantially open between said side channels, of a mast having a radial and axial thrust anti-friction bearing which includes one race supported on the top channel and another race connected to an intermediate portion of the mast, the mast extending through the last mentioned race and the top channel to the intermediate channel and being provided with a radial bearing mounting on the intermediate channel, said mast extending through the intermediate channel and being provided therebeneath with a gear, a motor-driven gear supported from the intermediate channel and disposed therebeneath in mesh with the gear of the mast, and a pan supported from said intermediate channel and providing a lubricant container in which portions of said gears are immersed.

3. The device of claim 2 in which the mast is tubular, the pan having an opening in its bottom through which the mast's interior is accessible, the pan having an upturned flange in sealed connection with the mast gear, in further combination with a winch mounted on the bottom channel and comprising a drum and a line extending through the open lower end of the mast to a point adjacent the top of the mast, the mast having a sheave mounted upon it and over which said line is trained.

4. The combination with a vehicle frame, of a unitary hoist comprising a rigid box frame having lower portions seated upon the vehicle frame and having splicing means straddling the vehicle frame and connected therewith at a level below the box frame, said box frame unitarily being provided with hoisting means and motors for the operation thereof, said box frame comprising a broad channel having top and side portions and provided with an intermediate and a bottom shelf, the hoisting means including a mast having an axial thrust bearing in the top portion of the box frame and a radial bearing in said intermediate shelf, said latter shelf having mounted upon it one of said motors and driving connections to said mast for the rotation thereof, said hoisting means further including a drum supported by the bottom shelf below the mast and a cable wound on the drum and extending upwardly through the mast, another of said motors being supported by the bottom shelf and having driving connections to said drum.

5. The combination with a vehicle frame, of a hoist unitarily comprising a rigid hoist frame seated upon the vehicle frame and comprising uprights, top and intermediate and bottom transverse members connecting said uprights, and splicing extensions of said uprights connected with the vehicle frame, a tubular mast extending through the top and intermediate members aforesaid and having an axial thrust bearing supporting it from the top member and a radial bearing rotatably journaling it in the intermediate member, a worm gear mounted on the mast below the intermediate member, a driving motor having driving connections including a worm meshing with the worm gear for the rotation of the mast, a winch mounted on the bottom transverse member of said frame and including a drum, a cable mounted on the drum and extending therefrom upwardly through the mast, a driving motor and operating connections for the drum supported by said lower member, a boom comprising an inner cylinder portion having pivotal connection with an intermediate portion of the mast and an extension portion projectable beyond the cylinder portion, linkage of a normally fixed length connecting the extension portion of the boom with the top of the mast, a guide sheave carried by the extension portion of the boom, a guide sheave carried by the mast near its top, said cable being trained over said sheaves and provided with work-engaging means, and means carried by said frame for the controlled delivery of hydraulic pressure to the cylinder portion of said boom for the projection of the extension portion of said boom to effect the lifting of the boom about its pivotal connection with the mast, and means also mounted on said frame for the controlled rotation of the mast and the winch drum.

6. In a device of the character described, the combination with a tubular mast, a mounting for the mast, and a winch having a cable extending upwardling through the mast, the mast being provided with a slot through which said cable emerges, arms attached to the mast at opposite sides of the slot, a sheave mounted on said arms and disposed in the slot and over which the cable is trained, and a boom connected with the mast and provided remote therefrom with a sheave over which the cable is trained, said mast having means providing a transverse fulcrum upon which the bottom is hinged to the mast for movement in a vertical plane which includes the mast, means for raising the boom respecting the mast about said pivotal connection, said arms having flaring extensions providing a seat in which the boom is received in its most elevated position.

7. A hoist for unitary mounting on a vehicle frame and comprising a rigid hoist frame having housing elements including side channels, top, bottom and intermediate channels, said channels having complementary flanges which are interconnected in bracing relation at the intersection of the top, bottom and intermediate channels with the side channels to form a rigid frame and substantially open between said side channels, a mast having a radial and an axial thrust bearing which include one race supported on the top channel and another race connected to an intermediate portion of the mast, the mast extending through the last mentioned race and the top channel to the intermediate channel and being provided with a radial bearing mounted on the intermediate channel, a boom pivotally mounted on the mast, a winch mounted on the bottom channel of the hoist frame and comprising a drum having a line trained over the top of the mast and the end of the boom, hydraulic motors mounted on the intermediate and bottom channel of the hoist frame and respectively connected with the mast and the winch, a hydraulic system with the mast and the winch, a hydraulic system mounted on the hoist frame and comprising a reservoir and a pump having valve controlled connections to said motors, and means mounted on the hoist frame and connected with the pump for the hydraulic elevation of the boom.

References Cited in the file of this patent

UNITED STATES PATENTS

| | | |
|---|---|---|
| 614,518 | Terry | Nov. 22, 1898 |
| 1,448,814 | Norris | Mar. 20, 1923 |
| 1,519,117 | Cochran | Dec. 16, 1924 |
| 1,839,368 | Baum | Jan. 5, 1932 |
| 1,869,747 | Howard | Aug. 2, 1932 |
| 1,923,780 | Faure et al. | Aug. 22, 1933 |
| 2,365,169 | Billings | Dec. 19, 1944 |
| 2,387,568 | Drott et al. | Oct. 23, 1945 |
| 2,475,963 | Howell | July 12, 1949 |
| 2,537,755 | Harbaugh | Jan. 9, 1951 |
| 2,592,633 | Wilson | Apr. 15, 1952 |
| 2,661,721 | Sherwen | Dec. 8, 1953 |
| 2,717,701 | Pitman | Sept. 13, 1955 |
| 2,740,535 | Bill | Apr. 3, 1956 |
| 2,774,483 | Raymond | Dec. 18, 1956 |

UNITED STATES PATENT OFFICE

CERTIFICATE OF CORRECTION

Patent No. 2,923,418 February 2, 1960

George E. McGuire et al.

It is hereby certified that error appears in the printed specification of the above numbered patent requiring correction and that the said Letters Patent should read as corrected below.

Column 6, line 9, for "etxension" read -- extension --; column 8, line 17, for "bottom" read -- boom --; lines 43 and 44, strike out "a hydraulic system with the mast and the winch,".

Signed and sealed this 5th day of July 1960.

(SEAL)
Attest:

KARL H. AXLINE
Attesting Officer

ROBERT C. WATSON
Commissioner of Patents